(12) United States Patent
Bozsak et al.

(10) Patent No.: US 11,624,347 B2
(45) Date of Patent: Apr. 11, 2023

(54) WIND TURBINE BLADE MADE OF THERMOPLASTIC POLYMER COMPOSITE, PART OF SAID BLADE AND PRODUCTION METHOD

(71) Applicant: Arkema France, Colombes (FR)

(72) Inventors: Virginia Bozsak, Versailles (FR); Guillaume R. Cledat, Marcq en Baroeul (FR); Pierre Gerard, Denguin (FR); Mark Hiemstra, Zwolle (NL); Henk Minnema, Korhorn (NL); Dirk Jan Kootstra, Beekbergen (NL)

(73) Assignee: ARKEMA FRANCE, Colombes (FR)

( * ) Notice: Subject to any disclaimer, the term of this patent is extended or adjusted under 35 U.S.C. 154(b) by 63 days.

(21) Appl. No.: 16/492,958

(22) PCT Filed: Mar. 13, 2018

(86) PCT No.: PCT/FR2018/050590
§ 371 (c)(1),
(2) Date: Sep. 11, 2019

(87) PCT Pub. No.: WO2018/172656
PCT Pub. Date: Sep. 27, 2018

(65) Prior Publication Data
US 2020/0018283 A1      Jan. 16, 2020

(30) Foreign Application Priority Data

Mar. 13, 2017 (FR) .................................. FR17.52045

(51) Int. Cl.
*F03D 1/06* (2006.01)
*B29D 99/00* (2010.01)

(52) U.S. Cl.
CPC ........ *F03D 1/0675* (2013.01); *F05B 2230/40* (2013.01); *F05B 2280/4007* (2013.01); *F05B 2280/6003* (2013.01)

(58) Field of Classification Search
CPC .... F03D 1/0675; F03D 1/0633; F03D 1/0641; F03D 1/065; F03D 1/0683;
(Continued)

(56) References Cited

U.S. PATENT DOCUMENTS 7,857,596 B2 * 12/2010 Rakutt et al. ............. B32B 3/18
416/229 R
7,976,282 B2 * 7/2011 Livingston ............ F03D 1/0675
416/226

(Continued)

FOREIGN PATENT DOCUMENTS

EP         2 691 634 B1    1/2015
WO    WO-2016193645 A1 * 12/2016  ............. B29C 70/42

OTHER PUBLICATIONS

Machine Translation of WO 2016193645 [retrieved on Aug. 6, 2021], Retrieved from: Espacenet. (Year: 2021).*

*Primary Examiner* — Eric J Zamora Alvarez
(74) *Attorney, Agent, or Firm* — Buchanan Ingersoll & Rooney P.C.

(57) ABSTRACT

The invention relates to a wind turbine blade (1) comprising an outer casing formed at least in part of panels (3) of thermoplastic polymer composite, defining a leading edge (4) and a trailing edge (5) of the wind turbine blade, and at least one longitudinal stiffening member (6) made of polymer composite, extending along a longitudinal axis (A) of the wind turbine blade inside said wind turbine blade (1), said stiffening member (6) being arranged between at least one panel defining the leading edge (4) and at least one panel
(Continued)

Figure 1:
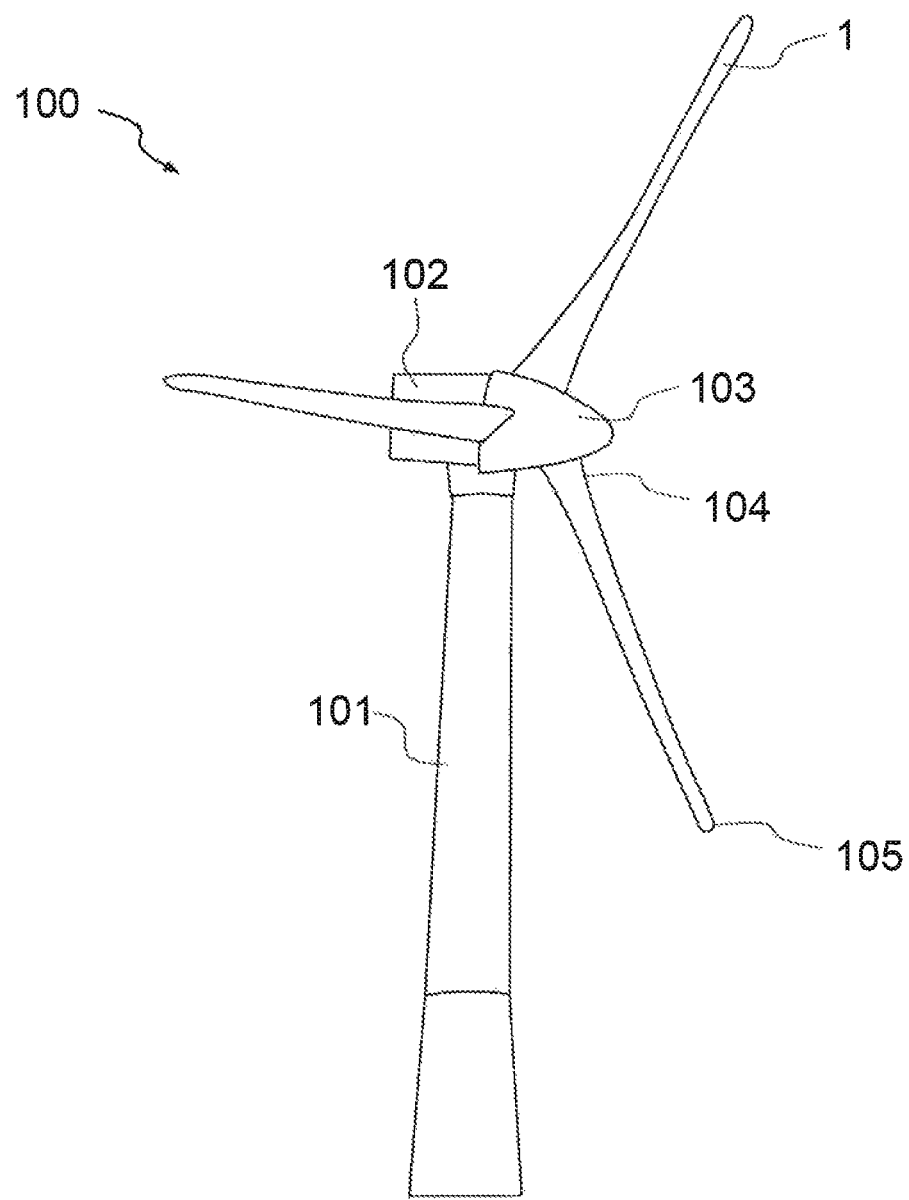

defining the trailing edge (5), characterized in that the thermoplastic polymer composite comprises a fibrous reinforcement and a (meth)acrylic thermoplastic polymer matrix and in that at least one panel (3) of thermoplastic polymer composite is connected to the stiffening member (6) by a weld-type interface (7).

32 Claims, 5 Drawing Sheets

(58) Field of Classification Search
CPC .......... F05B 2230/40; F05B 2280/4007; F05B 2280/6003; F05B 2280/702; F05B 2280/6013; F05B 2230/23; F05B 2230/232; F05B 2240/302

See application file for complete search history.

(56) References Cited

U.S. PATENT DOCUMENTS

| | | |
|---|---|---|
| 2009/0246548 A1 | 10/2009 | Hou et al. |
| 2010/0062238 A1* | 3/2010 | Doyle ............ B29C 70/02 428/295.1 |
| 2013/0343827 A1* | 12/2013 | Schibsbye ............ B60P 3/40 410/45 |
| 2014/0030538 A1* | 1/2014 | Boutillier ............ C08L 53/00 524/505 |
| 2014/0134383 A1 | 5/2014 | Hugon et al. |
| 2014/0256850 A1* | 9/2014 | Gerard ............ C08K 7/14 523/222 |
| 2015/0157504 A1* | 6/2015 | Korigodskiy ....... A61F 9/00781 604/8 |
| 2016/0017138 A1* | 1/2016 | Gerard ............ C08J 5/24 525/94 |
| 2017/0058864 A1 | 3/2017 | Tobin et al. |
| 2017/0074238 A1* | 3/2017 | Tobin ............ B29C 66/543 |

* cited by examiner

WIND TURBINE BLADE MADE OF THERMOPLASTIC POLYMER COMPOSITE, PART OF SAID BLADE AND PRODUCTION METHOD This application claims benefit, under U.S.C. § 119 or § 365 of PCT Application Number PCT/FR2018/050590, filed Mar. 13, 2018, and French Patent Application. Number FR1752045, filed Mar. 13, 2017, these documents being incorporated herein by reference.

The invention relates to the field of wind turbines, and more particularly blades of wind turbines manufactured from thermoplastic polymer composite. The invention relates to a wind turbine blade, the parts of said wind turbine blade and also the process for manufacturing said wind turbine blade.

PRIOR ART

At present, wind turbine blades are mainly composed of polymer composite in which a fibrous reinforcement is incorporated in a polymer matrix. Indeed, the properties required for wind turbine blades are in particular lightness, relatively high structural strength and tensile strength. This is mainly associated with the fact that the wind turbine blades must withstand high mechanical loads during the operation of the wind turbine, especially in the presence of strong gusts of wind. The fibers of the fibrous reinforcement may typically be composed of glass, carbon, ceramic, but also natural fibers. The polymer matrix mainly comprises polymers and ensures the fibers are held in place, transmits the tensions between the fibers and protects the fibers against external mechanical and chemical influences. The polymer matrix is generally thermosetting and the parts made of thermosetting polymer composite are associated with one another using thermosetting resin (e.g. epoxy or polyester or polyurethane adhesives).

However, thermosetting composite materials have several disadvantages, such as high costs when recycling these materials or the accumulation of large amounts of waste if recycling is not possible. Wind turbine blades incorporating thermoplastic materials have been proposed for example in application WO2010025830; nevertheless, the thermoplastics proposed are essentially proposed for forming the join between various parts of wind turbine blades, and they have a relatively high sensitivity to moisture or high melting points. Application US2017/0058864 describes an adjustable wind turbine blade constructed from thermosetting and/or thermoplastic materials. The thermoset-thermoplastic interface is welded; nevertheless, the blade contains a large portion of the thermosetting materials. Consequently, there is still a need for wind turbine blades predominantly comprising thermoplastics, and which are therefore recyclable, while offering mechanical and chemical properties which meet the requirements of the wind energy sector.

When constructing a wind turbine blade made of polymer composite, for example by low-pressure injection molding or infusion molding, the use of thermosetting resins generally leads to long cycle times. Moreover, these parts made of polymer composite are subsequently assembled during the industrial process before delivery to the installation site. Given the long cycle time observed when using a thermosetting polymer matrix, both during the manufacture of the parts and during the assembly, it is necessary to identify polymers that would be capable of reducing the cycle times and therefore of reducing the production time of wind turbine blades.

Moreover, wind turbine blades generally have a length of approximately 40 meters or more, sometimes approximately 90 or 100 meters. Thus, the delivery of the blades requires abnormal load transportation. In order to facilitate the management and installation of wind turbine blades, it is desirable to be able to readily and quickly perform at least some of the assembly at the installation site.

Technical Problem

The invention therefore aims to overcome the disadvantages of the prior art. In particular, the invention aims to provide a wind turbine blade made of thermoplastic polymer composite, which can be manufactured more quickly than conventional wind turbine blades while preferably being predominantly recyclable and resistant to the mechanical and chemical stresses to which wind turbine blades are subjected in operation.

Another aim of the invention is to provide a process for manufacturing wind turbine blades or parts of wind turbine blades more quickly than existing processes and enabling quick and easy assembly, repair or adjustments at the installation site.

BRIEF DESCRIPTION OF THE INVENTION

To this end, the invention relates to a wind turbine blade comprising an outer casing formed at least in part of panels of thermoplastic polymer composite, defining a leading edge and a trailing edge of the wind turbine blade, and at least one stiffening member made of polymer composite, extending along a longitudinal axis of the wind turbine blade inside said wind turbine blade, said stiffening member being arranged between at least one panel defining the leading edge and at least one panel defining the trailing edge, mainly characterized in that the thermoplastic polymer composite comprises a fibrous reinforcement and a (meth)acrylic thermoplastic polymer matrix and in that at least one panel of thermoplastic polymer composite is connected to the stiffening member by a weld-type interface.

Indeed, the use of a polymer composite comprising a (meth)acrylic thermoplastic polymer makes it possible to reduce the cycle times compared in particular to the thermosetting polymers conventionally used in these fields. In addition, the (meth)acrylic thermoplastic polymers used within the context of the invention may be used in the most commonly used industrial processes and therefore, unlike thermoplastics such as polyamides, do not require modification of the industrial equipment currently used in the construction of wind turbine blades.

Moreover, these wind turbine blades are easily recyclable, unlike the blades comprising panels made of thermosetting polymer composites usually used in this field. Finally, the presence of a weld-type interface affords the possibility, via a rise in temperature of the interface, to produce assemblies, carry out panel positioning adjustments or else repairs at the installation site without requiring a particular installation.

According to other optional characteristics of the process:
  the fibrous reinforcement is based on fibers having an aspect ratio of at least 1000. Such an aspect ratio makes it possible to obtain wind turbine blades having improved mechanical properties.
  the wind turbine blade does not comprise more than 50%, preferably not more than 40%, more preferably not more than 30%, even more preferably not more than 20%, more advantageously not more than 15% by weight and even more advantageously not more than 10% by weight of thermosetting polymers such as an epoxy resin. Thus, the wind turbine blade according to the invention has a very significant gain in terms of production time and an increased capacity to be recycled. Likewise, the wind turbine blade does not comprise more than 10%, preferably not more than 8%, advantageously not more than 7% by weight, more advantageously not more than 6% by weight and even more advantageously not more than 5% by weight of thermosetting adhesives.

the (meth)acrylic thermoplastic polymer is selected from a thermoplastic polymer resin, commonly referred to as "syrup", which is used to impregnate the reinforcing material, for example a fibrous reinforcement, and which polymerizes rapidly (e.g. between 30 seconds and 3 hours) with good conversion in order to increase productivity. Once polymerized, the thermoplastic polymer syrup constitutes the matrix of the composite material. A liquid composition or a syrup comprising a (meth)acrylic monomer and a precursor (meth)acrylic polymer is described in WO 2013/056845 and WO 2014/013028. These (meth)acrylic polymers are particularly suited to existing industrial processes for manufacturing wind turbine blades and afford the wind turbine blades satisfactory mechanical and chemical properties. In particular, the (meth)acrylic thermoplastic polymer is selected from poly(methyl methacrylate) (PMMA) or copolymers of methyl methacrylate (MMA), or mixtures thereof.

the fibrous reinforcement comprises fibers selected from carbon fibers, glass fibers, basalt fibers or polymer-based fibers, or plant fibers, alone or in a mixture.

the (meth)acrylic thermoplastic polymer matrix also comprises one or more additives or fillers. All the optional additives and fillers are added to the liquid (meth) acrylic syrup before the impregnation and/or the polymerization. The thermoplastic polymer composite may also comprise other additives and other fillers. As additives, mention may be made of organic additives such as impact modifiers or block copolymers, thermal stabilizers, UV stabilizers, lubricants and mixtures thereof. The impact modifier is in the form of fine particles having air elastomeric core and at least one thermoplastic shell, the size of the particles being generally less than 1 m and advantageously from 50 to 300 nm. The impact strength modifier is prepared by emulsion polymerization. The proportion of impact modifiers in the thermoplastic polymer matrix is 0 to 50%, preferably 0 to 25%, and advantageously 0 to 20% by weight. As fillers, mention may be made of carbon nanotubes or mineral fillers including mineral nanofillers ($TiO_2$, silica).

the (meth)acrylic thermoplastic polymer has a glass transition temperature (Tg) of between 50° C. and 160° C., preferably of between 70° C. and 140° C., and even more preferably 90° C. and 120° C. In addition, the (meth)acrylic thermoplastic polymer or a portion of the (meth)acrylic thermoplastic polymer has a melt flow index (MFI) according to ISO 1133 (230° C./3.8 kg) between less than 20 g/10 min. Preferably, the melt flow index is less than 18 g/10 min, more preferably less than 16 g/10 min, advantageously less than 13 g/10 min. This makes it possible to facilitate the production of wind turbine blades and also paves the way for easy assembly, adjustment or repair at the installation site.

the stiffening member has the form of an "I" beam comprising a web and two flanges connected to one another by the web.

the flanges are preferentially formed by a stack of strips made of thermoplastic polymer composite, which are preferably pre-impregnated, or by composite parts molded by low-pressure injection or infusion. This stack can be consolidated by welding.

the flanges are connected to the web by a weld-type interface.

the flanges are connected to the web by epoxy adhesive.

the leading edge is formed of a single monolithic part welded to the stiffening member. Indeed, the use of a (meth)acrylic thermoplastic polymer and a weld-type interface makes it possible to envision new wind turbine blade designs and especially blades with a leading edge formed of a single monolithic part welded to the stiffening member so as to facilitate assembly and improve wear resistance on the leading edge.

the panels of thermoplastic polymer composite forming the outer casing enclose a low density structure, such as wood (e.g. balsa), a honeycomb structure or expanded plastic.

the wind turbine blade comprises at least one resistive filament positioned at the weld-type interface.

the weld-type interface has a length of greater than 5 meters, preferably greater than 10 meters, more preferably greater than 20 meters.

the weld-type interface extends along a longitudinal axis of the wind turbine blade.

The invention also relates to a wind turbine blade part made of thermoplastic polymer composite for forming a wind turbine blade according to the invention, mainly characterized in that the thermoplastic polymer composite comprises a fibrous reinforcement and a (meth)acrylic thermoplastic polymer matrix.

Advantageously, the thermoplastic polymer composite of this wind turbine blade part is at least partially covered with a layer of (meth)acrylic thermoplastic polymer at least 0.5 mm, preferably at least 1 mm, more preferably at least 2 mm, even more preferably at least 3 mm thick. The thermoplastic polymer composite may for example be covered with this layer of (meth)acrylic thermoplastic polymer on the surface intended to be welded. This makes it possible in particular to avoid the appearance of zones with a lower concentration of resin at a weld-type interface which could lead to embrittlement of the wind turbine blade.

The invention also relates to a process for manufacturing a wind turbine blade according to the invention from at least two wind turbine blade parts made of thermoplastic polymer composite, the thermoplastic polymer composite comprising a fibrous reinforcement and a (meth)acrylic thermoplastic polymer matrix, said process comprising the steps of:

arranging at least two wind turbine blade parts made of thermoplastic polymer composite adjacently or overlapping at an assembly interface, heating to melt the (meth)acrylic thermoplastic polymer matrix at the assembly interface, and applying pressure at the interface to weld the at least two wind turbine blade parts made of thermoplastic polymer composite together so as to form a weld-type interface.

According to other optional characteristics of the process:

the process also comprises a prior step of manufacture of wind turbine blade parts, comprising the following sub-steps:

impregnation of a fibrous reinforcement with a liquid (meth)acrylic composition, polymerization of the liquid (meth)acrylic composition, impregnating said fibrous reinforcement.

the wind turbine blade parts made of thermoplastic polymer composite are manufactured by low-pressure injection molding, infusion molding or by molding strips pre-impregnated with (meth)acrylic thermoplastic polymer composite.

the wind turbine blade parts made of thermoplastic polymer composite are manufactured at a temperature of less than 150° C., preferably less than 120° C., even more preferably less than 100° C. indeed, the liquid (meth)acrylic composition used during the manufacture of the wind turbine blade parts made of thermoplastic polymer composite is liquid at a temperature well below the conventional melting points of conventional thermoplastics. Thus, this makes it possible to produce wind turbine blade parts of very large dimensions without having to implement processes in which said parts are heated to high temperatures.

the (meth)acrylic thermoplastic polymer matrix is melted by a technique selected from: ultrasonic welding, induction welding, resistance wire welding, friction stir welding, laser welding, heating by infrared or ultraviolet radiation, preferably by resistance wire welding.

during the heating step, the temperature at the assembly interface is between 160 and 300° C.

Other advantages and features of the invention will become apparent on reading the following description given by way of illustrative and non-limiting example, with reference to the appended figures, which depict:

FIG. 1: a wind turbine installation.

Figure 2:
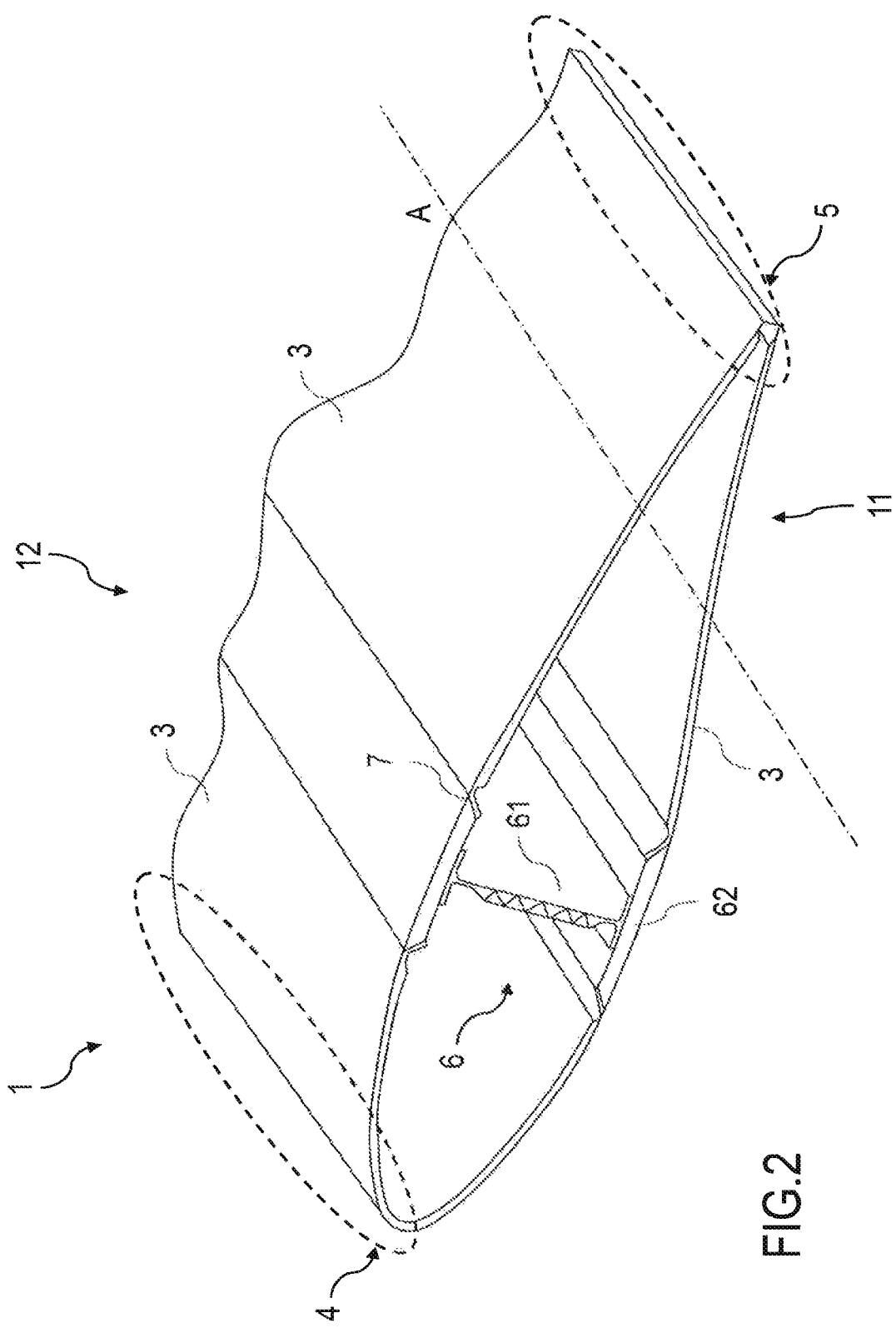

FIG. 2: a simplified illustration in perspective view of a cross section of a wind turbine blade, comprising a (meth) acrylic thermoplastic polymer composite and a weld-type interface.

Figure 3:
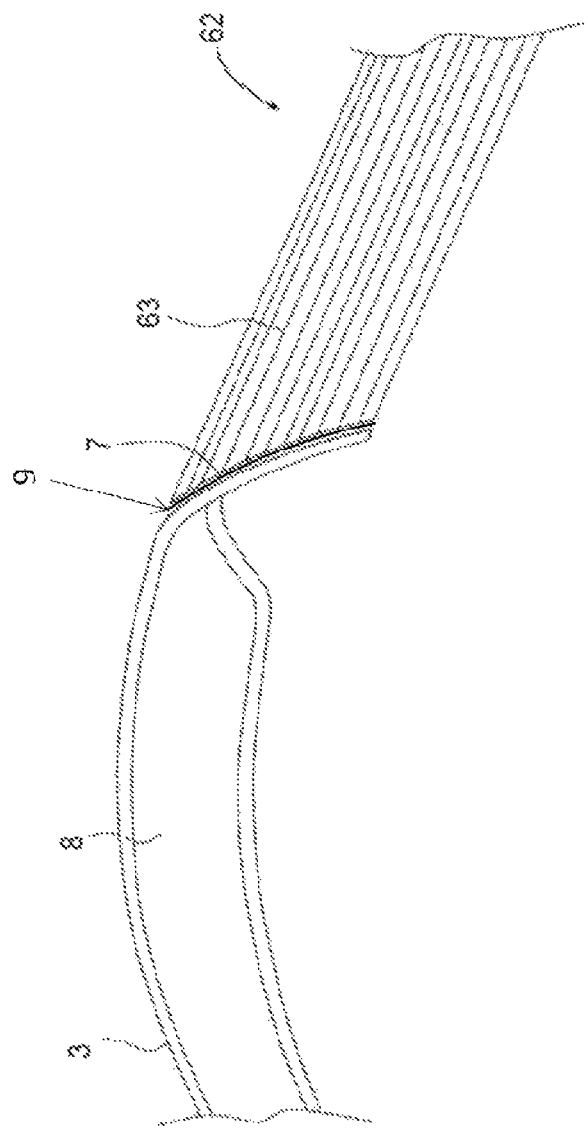

FIG. 3: a simplified illustration of an enlargement of a joining zone between a (meth)acrylic thermoplastic polymer composite panel and a stiffening member comprising a weld-type interface.

Figure 4:
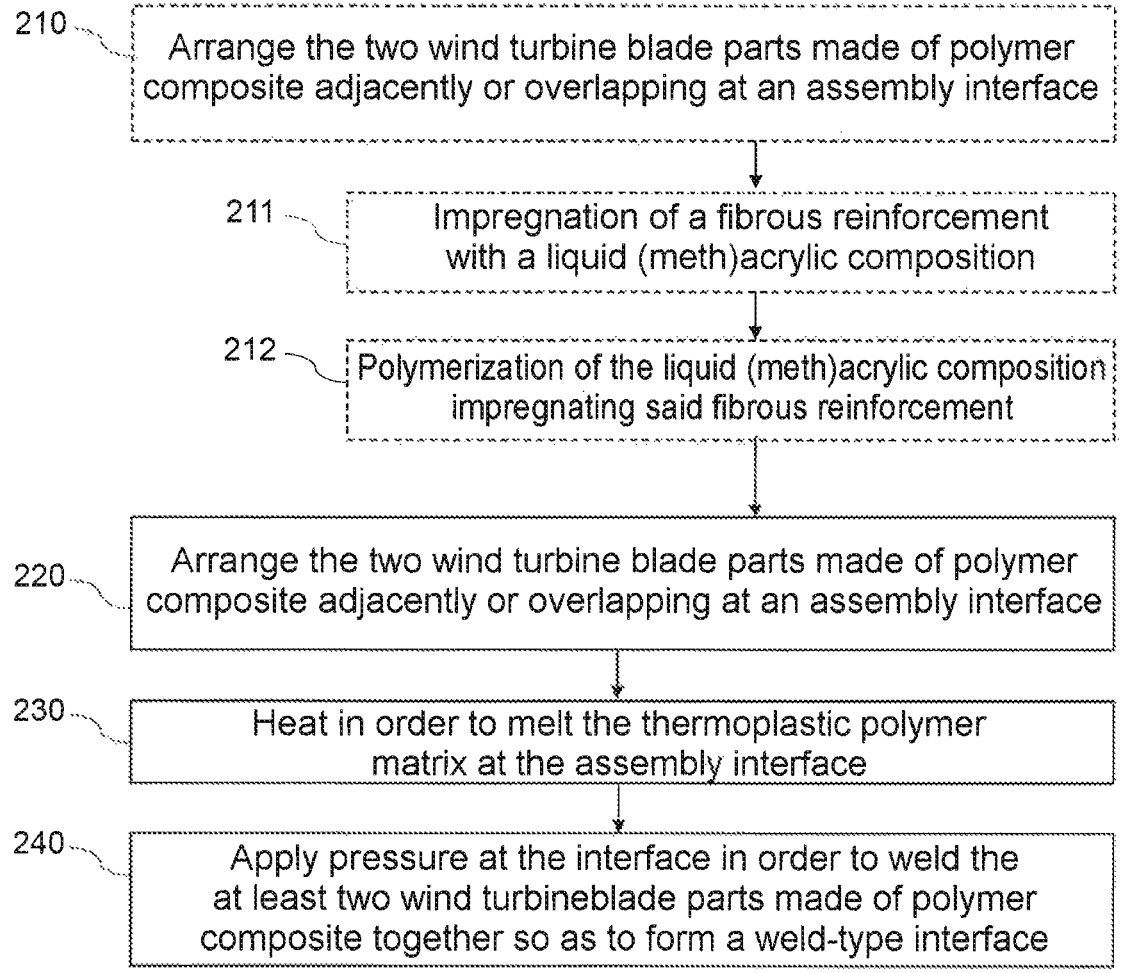

FIG. 4: a flow chart of a preferred embodiment of a manufacturing process according to the invention. The steps with dashed lines are optional.

Figure 5:
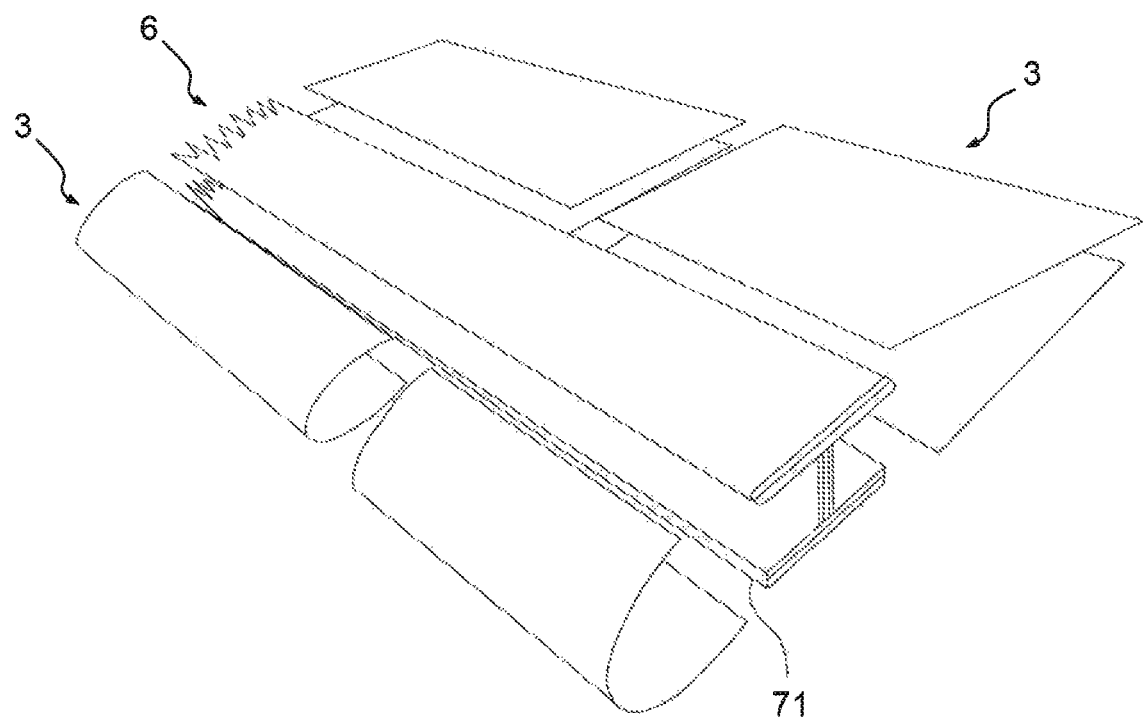

FIG. 5: the simplified diagram illustrating an exploded perspective view of different parts constituting a wind turbine blade.

DESCRIPTION OF THE INVENTION

In the remainder of the description, the "weld-type interface" corresponds to the welded join between parts, or portions of parts. It refers to the melted zone, that is to say the zone of thermoplastic polymer which has gone into the liquid state during the welding operation. The welding according to the invention can be carried out with or without providing thermoplastic filler material, especially (meth) acrylic thermoplastic filler material.

The "I-beam" according to the invention corresponds to a structure having a cross section in I or H form. The horizontal elements of the "I" are referred to as flanges while the vertical element is referred to as web. The I-beam according to the invention is preferably formed of thermoplastic polymer composite.

For the purposes of the invention, the term "resistive filament" means a filament comprising a material having a resistivity greater than $1 \times 10^{-2} \Omega$ $mm^2/m$ at 20° C., for example greater than $0.1 \Omega$ $mm^2/m$ at 20° C. The resistive filament may for example comprise metal or a metal alloy or any other organic conductive elements based on carbon such as a conductive polymeric film or wire based on carbon black, carbon nanotubes, graphenes. Preferably, the resistive filament has a high melting point, greater than the softening point or pour point (e.g. glass transition temperature) of the (meth)acrylic thermoplastic polymer according to the invention. The melting point of the resistive filament is preferably greater than 300° C., more preferably greater than 500° C., for example greater than 750° C. In the case of a conductive polymeric film or wire, it must have a pour point at least equal to that of the (meth)acrylic thermoplastic polymer.

For the purposes of the invention, the expression "polymer composite" denotes a multi-component material comprising at least two immiscible components, in which at least one component is a polymer and the other component may for example be a fibrous reinforcement.

For the purposes of the invention, "fibrous reinforcement" or "fibrous substrate" mean a plurality of fibers, unidirectional ravings or a continuous filament mat, fabrics, felts or nonwovens which may be in the form of strips, webs, braids, strands or parts.

"Matrix" means a material serving as binder which is capable of transferring forces to the fibrous reinforcement. The "polymer matrix" comprises polymers but may also comprise other compounds or materials. Thus, the "(meth) acrylic polymer matrix" refers to any type of compounds, polymers, oligomers, copolymers or block copolymers, both acrylic and methacrylic. However, it would not be departing from the scope of the invention if the (meth)acrylic polymer matrix comprised up to 10% by weight, preferably less than 5% by weight, of other nonacrylic monomers chosen for example from the group: butadiene, isoprene, styrene, substituted styrene, such as α-methylstyrene or tert-butylstyrene, cyclosiloxanes, vinylnaphthalenes and vinylpyridines.

"Polymer" means either a copolymer or a homopolymer. "Copolymer" means a polymer grouping together several different monomer units and "homopolymer" means a polymer grouping together identical monomer units, "Block copolymer" means a polymer comprising one or more uninterrupted sequences of each of the separate polymer entities, the polymer sequences being chemically different from one another and being bonded to one another by a covalent bond. These polymer sequences are also known as polymer blocks.

For the purposes of the invention, the term "radical initiator", denotes a compound that can start/initiate the polymerization of a monomer or monomers.

For the purposes of the invention, the term "polymerization" denotes the process of conversion of a monomer or of a mixture of monomers into a polymer.

For the purposes of the invention, the term "monomer" denotes a molecule which may undergo a polymerization.

For the purposes of the invention, "thermoplastic polymer" means a polymer that is generally solid at room temperature, which may be crystalline, semicrystalline or amorphous, and which softens during an increase in temperature, in particular after passing its glass transition temperature (Tg) and flows at higher temperature and that may exhibit obvious melting on passing its "melting" point (Tm) (when it is semicrystalline) and which becomes solid again during a reduction in temperature below its melting point and below its glass transition temperature. This also applies to thermoplastic polymers slightly crosslinked by the presence of multifunctional monomers or oligomers in the formulation of the (meth)acrylate "syrup", in weight percentage preferably of less than 10%, preferably less than 5%, and more preferably less than 2%, which can be thermoformed when heated above the softening point.

For the purposes of the invention, "thermosetting polymer" means a plastic material which is irreversibly transformed by polymerization into an insoluble polymer network.

A "(meth)acrylic monomer" means any type of acrylic and methacrylic monomer.

A "(meth)acrylic polymer" means a polymer essentially comprising (meth)acrylic monomers, which represent at least 50% by weight or more of the (meth)acrylic polymer.

For the purposes of the invention, the term "PMMA" denotes homo- and copolymers of methyl methacrylate (MMA), the weight ratio of MMA in the PMMA preferably being at least 70% by weight for the MMA copolymer.

In the remainder of the description, the same references are used to indicate the same elements.

According to a first aspect, the present invention relates to a wind turbine blade, the structure of which comprises a thermoplastic polymer composite comprising a fibrous reinforcement and a (meth)acrylic thermoplastic polymer matrix.

The (meth)acrylic thermoplastic polymers forming part of the matrix impregnating the fibrous reinforcement may be chosen from polymers and copolymers of the family of acrylics, such as polyacrylates. They are more particularly selected from polymethyl methacrylate (PMMA) or derivatives thereof or copolymers of methyl methacrylate (MMA) or mixtures thereof.

Preferably, the (meth)acrylic thermoplastic polymer, forming the (meth)acrylic thermoplastic polymer matrix, has a glass transition temperature (Tg) of between 50° C. and 160° C., preferably between 70° C. and 140° C., and even more preferably 90° C. and 120° C. This aspect gives it an advantage over other thermoplastic polymers such as polyamines. Indeed, polyamines generally have very high melting points, namely from 200° C. and higher, which does not facilitate on-site assembly as is the case according to the process of the invention. Glass transition temperatures or melting points can be measured by methods well known to those skilled in the art. Preferably, these temperatures are measured by Differential Scanning calorimetry according to the conditions specified in standards ISO 11357-2/2013 for Tg and ISO 11357-3/2011 for Tm. In addition, the (meth) acrylic thermoplastic polymer or a portion of the (meth) acrylic thermoplastic polymer has a melt flow index (MFI) according to ISO 1133 (230° C./3.8 kg) of less than 20 g/10 min. Preferably, the melt flow index is less than 18 g/10 min, more preferably less than 16 g/10 min, advantageously less than 13 g/10 min.

In addition, preferably, the wind turbine blade according to the invention does not comprise more than 50% by weight, more preferably not more than 40% by weight, more preferably not more than 30% by weight, advantageously not more than 20% by weight, more advantageously not more than 1.5% by weight and even more advantageously not more than 10% by weight of thermosetting polymers such as epoxy or polyester or polyurethane resins. Thermosetting polymers have hitherto generally been used in the manufacture of polymer composite materials used for the formation of wind turbine blades or wind turbine blade parts. Likewise, preferably, the wind turbine blade according to the invention does not comprise more than 10% by weight, more preferably not more than 9% by weight and even more preferably not more than 8% by weight, advantageously not more than 7% by weight, more advantageously not more than 6% by weight and even more advantageously not more than 5% by weight of adhesives, preferably thermosetting adhesives. Indeed, the adhesive bonding of the different wind turbine blade parts is generally carried out with thermosetting structural adhesive of epoxy resin type.

In the context of the invention, the use of thermoplastic polymer composite panels comprising a fibrous reinforcement and a (meth)acrylic thermoplastic polymer matrix makes it possible to significantly reduce the amount of thermosetting polymer used in the wind turbine blades and opens up possibilities which had not been considered for panels of thermosetting polymer composite, such as recycling of a majority of the blade, as well as facilitated onsite mounting or repair.

As will be detailed below, the (meth)acrylic thermoplastic polymer matrix can be obtained from the polymerization of a liquid (meth)acrylic composition comprising a (meth) acrylic monomer or a mixture of (meth)acrylic monomers, a precursor (meth)acrylic polymer and at least one radical initiator.

The (meth)acrylic thermoplastic polymer matrix is formed of (meth)acrylic thermoplastic polymer but it may further comprise one or more additives and/or one or more The carbonaceous fillers may in particular be activated carbon, natural anthracite, synthetic anthracite, carbon black, natural graphite, synthetic graphite, carbonaceous nanofillers or mixtures thereof. They are preferably chosen from carbonaceous nanofillers, in particular graphenes and/or carbon nanotubes and/or carbon nanofibrils or mixtures thereof. These fillers make it possible to conduct electricity and heat, and consequently make it possible to improve the lubrication of the polymer matrix when it is heated. They may then enable an increased reduction in cycle times or facilitate assembly, adjustment or repair at the installation site.

The mineral fillers include in particular metal hydroxides, which are more particularly in the form of alumina trihydrate ($Al(OH)_3$) or magnesium hydroxide ($Mg(OH)$) or magnesium oxide (MgO), calcium hydroxides and mineral fillers such as calcium carbonate, titanium dioxide or silica or mineral nanofillers such as nano titanium dioxides or nanosilicas.

As additives, mention may be made of organic additives such as impact strength modifiers or block copolymers, thermal stabilizers, UV stabilizers, lubricants, viscosity modifiers, pH modifiers (sodium hydroxide), particle size modifiers (sodium sulfate), biocides, and mixtures thereof. These additives make it possible to improve in particular the rheological, chemical and adhesion properties of the (meth) acrylic thermoplastic polymer matrix.

The weight percentage of all of the additives and fillers relative to the total weight of (meth)acrylic thermoplastic polymer matrix is preferably less than 30%, preferably less than 10%.

Fibrous reinforcement generally refers to a plurality of fibers, unidirectional rovings or a continuous filament mat, fabrics, felts or nonwovens which may be in the form of strips, webs, braids, strands or parts.

A fibrous reinforcement comprises an assembly of one or more fibers, generally several fibers, said assembly being able to have different forms and dimensions; one-dimensional, two-dimensional or three-dimensional. The one-dimensional form corresponds to linear long fibers. The fibers may be discontinuous or continuous. The fibers may be arranged randomly or parallel to one another, in the form of a continuous filament. The two-dimensional form corresponds to nonwoven reinforcements or fibrous mats or woven rovings or bundles of fibers, which may also be braided. Even if the two-dimensional form has a certain thickness and consequently in principle a third dimension, it is considered to be two-dimensional according to the present invention. The three-dimensional form corresponds for example to stacked or folded nonwoven fibrous reinforcements or fibrous mats or stacked or folded bundles of fibers or mixtures thereof; an assembly of the two-dimensional form in the third dimension.

The fibers may be discontinuous or continuous. When the fibers are continuous, the assembly thereof forms fabrics. Preferably, the fibrous reinforcement is based on continuous fibers. A fiber is defined by its aspect ratio, which is the ratio between the length and the diameter of the fiber. The fibers used in the present invention are long fibers obtained from continuous fibers, or continuous fibers. The fibers have an aspect ratio of at least 1000, preferably at least 1500, more preferably at least 2000, advantageously at least 3000 and more advantageously at least 5000, even more advantageously at least 6000, even more advantageously at least 7500 and most advantageously at least 10 000. The continuous fibers have an aspect ratio of at least 1000. The dimensions of a fiber can be measured by methods well known to those skilled in the art. Preferably, these dimensions are measured by microscopy according to standard ISO 137.

The origins of the fibers constituting the fibrous reinforcement may be natural or synthetic. Natural materials that may be mentioned include plant fibers, wood fibers, animal fibers or mineral fibers. Plant fibers are, for example, sisal, jute, hemp, linen, cotton, coconut, and banana fibers. Animal fibers are for example wool or fur. The mineral fibers may also be chosen from glass fibers, in particular of type E, R or S2, basalt fibers, carbon fibers, boron fibers or silica fibers.

Synthetic materials that may be mentioned include polymer fibers selected from thermosetting polymer fibers, thermoplastic polymers or mixtures thereof. The polymer fibers may consist of polyamide (aliphatic or aromatic), polyester, polyvinyl alcohol, polyolefins, polyurethanes, polyvinyl chloride, polyethylene, unsaturated polyesters, epoxy resins and vinyl esters.

Preferably, the fibrous reinforcement of the present invention comprises plant fibers, wood fibers, animal fibers, mineral fibers, synthetic polymer fibers, glass fibers, basalt fibers and carbon fibers, alone or in a mixture. More preferably, the fibrous reinforcement of the present invention comprises carbon fibers or glass fibers. More preferably, the fibrous reinforcement of the present invention essentially consists of carbon fibers or glass fibers.

The fibers of the fibrous reinforcement have for example a diameter of between 0.005 μm and 100 um, preferably between 1 μm and 50 μm, more preferably between 5 μm and 30 μm and advantageously between 10 μm and 25 μm.

Preferably, the fibers of the fibrous reinforcement of the present invention are selected from continuous fibers for the one-dimensional form, or from long or continuous fibers for the two-dimensional or three-dimensional form of the fibrous reinforcement.

FIG. 1 illustrates a conventional wind turbine 100 with a horizontal axis comprising a mast 101, a nacelle 102 and a rotor with a substantially horizontal rotor shaft. The rotor comprises a hub 103 and three wind turbine blades 1 extending radially from the hub 103, each having a root 104 of the wind turbine blade closest to the hub 103 and a tip 105 of the wind turbine blade farthest from the hub 103. The rotor is driven by wind energy; it is connected directly or indirectly (via a geared speed multiplier) to the mechanical system that will use the energy collected (pump, electric generator, etc.).

As can be seen in FIG. 1, the wind turbine blade 1 generally has a cross-sectional form that changes between the tip 105 and the root 104 of the wind turbine blade, corresponding to an attachment zone. The wind turbine blade 1 comprises an outer casing defining a lower surface 11 and an upper surface 12 and also a leading edge 4 and a trailing edge 5. This outer casing, at least partially defining an outer surface of the wind turbine blade 1, is formed, at least in part, of panels 3 of thermoplastic polymer composite. The outer casing is for example more particularly formed by the panels 3 of thermoplastic polymer composite associated with a stiffening member 6. Alternatively, the stiffening member 6 may be entirely surrounded by the panels 3 of thermoplastic polymer composite and thus not participate in the formation of the outer casing.

The panels 3 of thermoplastic polymer composite may assume various forms such as strips, sheets, plates or more broadly speaking rigid polymer composite parts.

The panels 3 of thermoplastic polymer composite may further be subjected to a subsequent treatment with the aim of strengthening the outer casing and improving the mechanical and chemical properties thereof. The treatment may for example be specifically located on certain areas of the outer surface of the wind turbine blade 1, such as along the leading edge 4. In this case, the treatment may comprise the deposition of a protective layer of plastic or metal covering the leading edge 4.

As presented in FIG. 2, the wind turbine blade 1 also comprises at least one longitudinal stiffening member 6 made of thermoplastic polymer composite inside said wind turbine blade 1, extending along a longitudinal axis A of the wind turbine blade. The stiffening member 6 is arranged between at least one panel defining the leading edge 4 and at least one panel defining the trailing edge 5.

As presented in FIG. 2, the wind turbine blade according to the invention may have a leading edge formed of a single monolithic part welded to the stiffening member 6. Indeed, the present invention, based at least in part on the use of thermoplastic polymer composite comprising a fibrous reinforcement and a (meth)acrylic thermoplastic polymer matrix makes it possible to produce new wind turbine blade designs both in terms of form, as presented in FIG. 2 with a leading edge formed of a single monolithic part welded to the stiffening member 6, and in terms of the assembly method as will be detailed below.

The panel elements 3 and the stiffening member are connected so as to form, together, at least a portion of the outer casing of the wind turbine blade.

The stiffening member 6 imparts increased stability and local stiffness compared to the panel of thermoplastic polymer composite alone. The stiffening member 6 extends along a longitudinal axis A of the wind turbine blade inside said wind turbine blade 1 so as to stabilize the structure thereof. Preferably, the stiffening member 6 comprises a thermoplastic polymer composite, the thermoplastic polymer composite comprising a fibrous reinforcement and a (meth)acrylic thermoplastic polymer matrix.

As presented in FIG. 2, the stiffening member 6 has the form of an "I" beam comprising a web 61 and two flanges 62 connected to one another by the web 61. The web may be formed of an assembly comprising a thermoplastic polymer composite enclosing a low density structure. This arrangement forms a sandwich-type structure where the low-density structure is surrounded by one or more panels of thermoplastic polymer composite. Alternatively, the stiffening member 6 may assume the form of a tube having a section having a quadrilateral shape (preferably square or rectangle) which may thus correspond to a stiffening member comprising two webs and two flanges.

As presented in FIG. 3, the flanges 62 may be formed by a stack of strips 63 made of thermoplastic polymer composite, the thermoplastic polymer composite comprising a fibrous reinforcement and a (meth)acrylic thermoplastic polymer matrix. Preferably, the flanges 62 are connected to the web 61 by a weld-type interface 7. Alternatively the flanges 62 may be connected to the web 61 by epoxy or polyester or polyurethane adhesive.

FIG. 3 depicts an enlarged view of the weld-type interface 7 connecting a panel of thermoplastic polymer composite to the stiffening member 6. A resistive filament 9 is positioned at the weld-type interface.

The weld-type interface 7 has a thickness of greater than or equal to 0.5 mm, preferably greater than or equal to 1 mm, more preferably greater than or equal to 2 mm.

The thickness of the weld-type interface 7 may be measured by conventional methods, for example from a vertical section of said weld-type interface 7.

When the weld-type interface 7 makes it possible to connect a panel of thermoplastic polymer composite to the stiffening member 6, then it extends along a longitudinal axis A of the wind turbine blade. FIG. 3 only depicts a sectional view of the weld-type interface 7, but the latter preferably extends over the whole length of the stiffening member. Thus, the weld-type interface may have a length of greater than 5 meters, preferably greater than 10 meters and even more preferably greater than 20 meters.

In the depiction according to FIG. 3, it is also possible to discern the presence of a low-density structure 8 between two panels 3 of thermoplastic polymer composite. Indeed, preferably, the panels 3 of thermoplastic polymer composite at least partially forming the outer casing enclose a low-density structure 8. This arrangement forms a sandwich-type structure where the low-density structure 8 is surrounded by one or more panels 3 of thermoplastic polymer composite. The low-density structure generally has a density of less than 200 kg/m$^3$, preferably less than 150 kg/m$^3$, and even more preferably less than 75 kg/m$^3$. The low-density structure is for example selected from wood (such as balsa), a honeycomb structure or expanded or foamed plastic (such as expanded polystyrene or PET (polyethylene terephthalate) foam, or PVC (polyvinyl chloride) foam.

According to another aspect, the invention relates to a wind turbine blade part 2 made of thermoplastic polymer composite for forming a wind turbine blade 1 according to the invention, in which the thermoplastic polymer composite comprises a fibrous reinforcement and a (meth)acrylic thermoplastic polymer matrix.

Preferably, the thermoplastic polymer composite of the wind turbine blade part. 2 is at least partially covered with a layer of (meth)acrylic thermoplastic polymer at least 1 mm, preferably at least 2 mm, more preferably at least 3 mm, thick, for example on a surface intended to be welded. The thermoplastic polymer composite is more particularly covered with this layer of (meth)acrylic thermoplastic polymer at an assembly interface zone intended to form the future weld-type interface. This makes it possible in particular to avoid the appearance of zones with a lower concentration of thermoplastic polymer. Alternatively, the wind turbine blade part 2 may have at least one face covered with the layer of (meth)acrylic thermoplastic polymer.

According to another aspect, and as presented in FIG. 5, the invention relates to a process for manufacturing a wind turbine blade 1 according to the invention from at least two wind turbine blade parts made of thermoplastic polymer composite, the thermoplastic polymer composite comprising a fibrous reinforcement and a (meth)acrylic thermoplastic polymer matrix, said process comprising the steps of:

arranging 220 the two wind turbine blade parts made of thermoplastic polymer composite adjacently or overlapping at an assembly interface 71, heating 230 to melt the (meth)acrylic thermoplastic polymer matrix at the assembly interface 71, and applying 240 pressure at the interface to weld the at least two wind turbine blade parts made of thermoplastic polymer composite together so as to form a weld-type interface 7.

The (meth)acrylic thermoplastic polymer matrix may be melted by a technique selected from: ultrasonic welding, induction welding, resistance wire welding, friction stir welding, laser welding, heating by infrared or ultraviolet radiation. It is preferably melted by resistance wire welding. The welding according to the invention can be carried out with or without providing (meth)acrylic thermoplastic filler material.

Preferably, during the heating step 230, the temperature at the assembly interface 71 is between 160 and 300° C. This temperature can be measured conventionally by infrared thermometer.

In addition, the process 200 for manufacturing a wind turbine blade according to the invention may comprise a prior step 210 of manufacture of wind turbine blade parts made of thermoplastic polymer composite, the thermoplastic polymer composite comprising a fibrous reinforcement and a (meth)acrylic thermoplastic polymer matrix.

The step 210 of manufacturing wind turbine blade parts comprises the following sub-steps:

impregnation 211 of a fibrous reinforcement with a liquid (meth)acrylic composition, polymerization 212 of the liquid (meth)acrylic composition, impregnating said fibrous reinforcement.

One of the advantages of the present invention is that the wind turbine blade parts 2 made of thermoplastic polymer composite can be manufactured at a temperature of less than 150° C., preferably less than 140° C., even more preferably less than 125° C., advantageously less than 120° C., more advantageously less than 110° C. and even more advantageously less than 100° C. For example, the step of impregnating the fibrous reinforcement with the liquid (meth)acrylic composition is carried out at a temperature of less than 150° C., preferably less than 120° C., even more preferably less than 100° C. or less than 80° C. Indeed, the liquid (meth)acrylic composition used for the manufacture of the wind turbine blade parts 2 made of thermoplastic polymer composite is liquid at a temperature well below the conventional melting points of conventional thermoplastics. Thus, this makes it possible to produce wind turbine blade parts which are of very large dimensions without having to implement processes in which said parts are heated to high temperatures. Thus, it should be understood that the processes that may be used to manufacture these parts do not require a step of heating at a high temperature as could have been the ease with a conventional thermoplastic.

The step 210 of manufacturing a wind turbine blade part 2 may also comprise a sub-step 213 of deposition of a layer of (meth)acrylic thermoplastic polymer. This deposition may preferably be at an assembly interface zone intended to form the future weld-type interface. Alternatively, the deposition is made over the whole wind turbine blade part 2.

Regarding the step 210 of manufacturing wind turbine blade parts, different processes can be used to manufacture these parts. Mention may be made of vacuum-assisted resin infusion (VARI), pultrusion, vacuum infusion molding, pressurized infusion molding, autoclave molding, resin transfer molding (RTM) and variants thereof such as (HP-RTM, C-RTM, I-RTM), reaction-injection molding (RIM), reinforced reaction-injection molding (R-RIM) and variants thereof, press molding, compression molding, liquid compression molding (LCM) or sheet molding (SMC) or bulk molding (BMC). Preferably, the wind turbine blade parts made of polymer composite are manufactured by low-pressure injection molding, infusion molding or by molding strips of (meth)acrylic thermoplastic polymer composite, for example pre-impregnated strips.

A first preferred manufacturing process for manufacturing wind turbine blade parts is a process according to which the liquid (meth)acrylic composition is transferred onto the fibrous reinforcement by impregnation of the fibrous reinforcement in a mold. Processes requiring a mold are listed above and include the word molding.

A second preferred manufacturing process for manufacturing wind turbine blade parts are processes according to which the liquid composition is used in the pultrusion process. The fibers are guided via a batch of resin comprising the composition according to the invention. The fibers in the form of fibrous reinforcement are, for example, in the form of a unidirectional roving or a continuous filament mat. After impregnation in the resin batch, the wet fibers are pulled through a heated die, where the polymerization occurs.

A third preferred manufacturing process is vacuum-assisted resin infusion (VARI).

The process for manufacturing wind turbine blade parts but also mechanical or structured parts or products may further comprise the step of post-forming. Post-forming involves bending and also modifying the shape of the composite part. The process for manufacturing wind turbine blade parts may further comprise a step of rolling.

The thermoplastic parts obtained by the processes according to the invention can be post-formed after polymerization of the liquid composition of the invention. Forming involves bending and also modifying the shape of the composite part.

Regarding the liquid (meth)acrylic composition, it may comprise a (meth)acrylic monomer, a precursor (meth)acrylic polymer and a radical initiator as described in WO2013/056845 and WO2014/013028.

In addition, during the impregnation, while preparing the polymer composite, the viscosity of the liquid (meth)acrylic composition or impregnation syrup must be regulated and adapted so as not to be too fluid or too viscous, in order to correctly impregnate each fiber of the fibrous reinforcement. When the wetting is partial, either because the syrup is too fluid or too viscous, "naked" zones, i.e. non-impregnated zones, and zones in which drops of polymer form on the fibers, which are the cause of bubble formation, respectively, appear. These "naked" zones and these bubbles give rise to the appearance of defects in the final composite material, which are the cause, inter alma, of a loss of mechanical strength of the final composite material. Moreover, in the case of use without impregnation, it is desirable to have a liquid composition which polymerizes rapidly with good conversion, in order to increase productivity.

Thus, said liquid (meth)acrylic composition preferably has a dynamic viscosity of between 10 mPa*s and 10 000 mPa*s at 25° C. The dynamic viscosity of the liquid composition or of the (meth)acrylic syrup is in a range from 10 mPa*s to 10000 mPa*s, preferably from 20 mPa*s to 7000 mPa*s and advantageously from 20 mPa*s to 5000 mPa*s. The viscosity of the liquid (meth)acrylic composition, or liquid (meth)acrylic syrup, can be easily measured with a rheometer or viscometer. The dynamic viscosity is measured at 25° C. If the liquid (meth)acrylic syrup exhibits Newtonian behavior, meaning without shear thinning, the dynamic viscosity is independent of the shearing in a rheometer or the speed of the spindle in a viscometer. If the liquid composition exhibits non-Newtonian behavior, i.e. with shear thinning, the dynamic viscosity is measured at a shear rate of $1$ s$^{-1}$ at 25° C.

The (meth)acrylic monomer, the monomer is selected from acrylic acid, methacrylic acid, alkylacrylic monomers, alkylmethacrylic monomers, hydroxyalkylacrylic monomers and hydroxyalkylmethacrylic monomers, and mixtures thereof.

Preferably, the (meth)acrylic monomer is selected from acrylic acid, methacrylic acid, hydroxyakyl acrylic monomers, hydroxyalkylmethacrylic monomers, alkylacrylic monomers, alkylmethacrylic monomers and mixtures thereof, the alkyl group containing 1 to 22 linear, branched or cyclic carbons; the alkyl group preferably containing from 1 to 12 linear, branched or cyclic carbons.

Advantageously, the (meth)acrylic monomer is selected from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate, hydroxyethyl acrylate and hydroxyethyl methacrylate, and mixtures thereof.

According to a preferred embodiment, at least 50% by weight and preferably at least 60% by weight of the (meth)acrylic monomer is methyl methacrylate.

According to a first more preferred embodiment, at least 50% by weight, preferably at least 60% by weight, more preferably at least 70% by weight, advantageously at least 80% by weight and even more advantageously 90% by weight of the monomer is a mixture of methyl methacrylate with optionally at least one other monomer.

Regarding the precursor (meth)acrylic polymer, mention may be made of polyalkyl methacrylates or polyalkyl acrylates. According to a preferred embodiment, the precursor (meth)acrylic polymer is poly(methyl methacrylate) (PMMA).

According to one embodiment, the methyl methacrylate (MMA) homo- or copolymer comprises at least 70%, preferably at least 80%, advantageously at least 90% and more advantageously at least 95% by weight of methyl methacrylate.

According to another embodiment, the PMMA is a mixture of at least one homopolymer and at least one copolymer of MMA, or a mixture of at least two homopolymers or two copolymers of MMA with a different average molecular weight or a mixture of at least two copolymers of MMA having a different composition of monomers.

The copolymer of methyl methacrylate (MMA) comprises from 70% to 99.7% by weight of methyl methacrylate and from 0.3% to 30% by weight of at least one monomer containing at least one ethylenic unsaturation that can copolymerize with methyl methacrylate.

These monomers are well known and mention may particularly be made of acrylic and methacrylic acids and alkyl (meth)acrylates in which the alkyl group contains from 1 to 12 carbon atoms. By way of examples, mention may be made of methyl acrylate and ethyl, butyl or 2-ethylhexyl (meth)acrylate. Preferably, the comonomer is an alkyl acrylate in which the alkyl group contains from 1 to 4 carbon atoms.

According to a first preferred embodiment, the copolymer of methyl methacrylate (MMA) comprises from 80% to 99.7%, advantageously from 90% to 99.7% and more advantageously from 90% to 99.5% by weight of methyl methacrylate and from 0.3% to 20%, advantageously from 0.3% to 10% and more advantageously from 0.5% to 10% by weight of at least one monomer, containing at least one ethylenic unsaturation, that can copolymerize with the methyl methacrylate. Preferably, the comonomer is chosen from methyl acrylate and ethyl acrylate and mixtures thereof.

The weight-average molecular weight of the precursor (meth)acrylic polymer should be high, meaning greater than 50 000 g/mol, preferably greater than 100 000 g/mol. The weight-average molecular weight may be measured by size exclusion chromatography.

The precursor (meth)acrylic polymer is fully soluble in the (meth)acrylic monomer or in the mixture of (meth)acrylic monomers, it enables the viscosity of the (meth)acrylic monomer or the mixture of (meth)acrylic monomers to be increased. The liquid composition or solution obtained is generally referred to as "syrup" or "prepolymer". The dynamic viscosity value of the liquid (meth)acrylic syrup is between 10 mPa·s and 10 000 mPa·s. The viscosity of the syrup can be readily measured with a rheometer or a viscometer. The dynamic viscosity is measured at 25° C. Advantageously, the liquid (meth)acrylic syrup contains no additional solvent added intentionally.

The (meth)acrylic monomer or the mixture of (meth)acrylic monomers in the liquid (meth)acrylic composition or the liquid (meth)acrylic syrup are present at an amount of at least 40% by weight, preferably of at least 45% by weight, more preferably of at least 50% by weight, advantageously of at least 60% by weight and more advantageously of at least 65% by weight in the liquid (meth)acrylic composition.

The precursor (meth)acrylic polymer in the liquid (meth)acrylic composition or the liquid (meth)acrylic syrup is present at an amount of at least 10% by weight, preferably of at least 15% by weight, advantageously of at least 18% by weight and more advantageously of at least 20% by weight in the liquid (meth)acrylic composition.

The precursor (meth)acrylic polymer in the liquid (meth)acrylic composition or the liquid (meth)acrylic syrup is present at an amount of at most 60% by weight, preferably of at most 50% by weight, advantageously of at most 40% by weight and more advantageously of at most 35% by weight in the liquid (meth)acrylic composition.

The liquid (meth)acrylic composition or the syrup, the syrup compounds are incorporated in the following percentages by weight:
  the (meth)acrylic monomer in the liquid composition or the (meth)acrylic syrup are present in proportions of between 40% and 90% by weight and preferably between 45% and 85% by weight of the composition consisting of the (meth)acrylic monomer and the (meth)acrylic polymer,
  the (meth)acrylic polymer in the liquid composition or the (meth)acrylic syrup are present in proportions of between 10% and 60% by weight and advantageously between 15% and 55% by weight of the composition consisting of the (meth)acrylic monomer(s) and the (meth)acrylic polymer; preferably, the (meth)acrylic polymer in the liquid composition is present in proportions of between 18% and 30%, more preferably between 20% and 25% by weight of the composition consisting of the (meth)acrylic monomer and the (meth)acrylic polymer.

Regarding the radical initiator, mention may be made of preferably water-soluble radical polymerization initiators or liposoluble or partially liposoluble radical polymerization initiators.

The water-soluble radical polymerization initiators are, in particular, sodium, potassium or ammonium persulfates, used alone or in the presence of reducing agents such as sodium metabisulfites or hydrosulfites, sodium thiosulfate, sodium formaldehyde-sulfoxylate, a mixture of disodium salt of 2-hydroxy-2-sulfinoacetic acid, sodium sulfite and disodium salt of 2-hydroxy-2-sulfoacetic acid, or else a mixture of disodium salt of hydroxysulfinoacetic acid and disodium salt of hydroxysulfoacetic acid.

The liposoluble or partially liposoluble radical polymerization initiators are, in particular, peroxides or hydroperoxides and derivatives of azobisisobutyronitrite. The peroxides or hydroperoxides are used in combination with the reducing agents described above so as to lower their activation temperature.

The percentage by weight of initiator relative to the total weight of monomer mixture is preferably between 0.05% by weight and 3% by weight, preferably between 0.1% by weight and 2% by weight.

As presented in FIG. 5, the wind turbine blades 1 according to the invention may comprise a plurality of parts 2 made of thermoplastic polymer composite in which the thermoplastic polymer composite comprises a fibrous reinforcement and a (meth)acrylic thermoplastic polymer matrix and in which said wind turbine blade parts 2 have assembly interface zones 71, making it possible to quickly and easily weld them to a stiffening member 6.

Thus, the invention provides wind turbine blades that can be manufactured more quickly than conventional wind turbine blades while being recyclable and satisfactory from a mechanical and chemical stability perspective. The invention also enables easy and quick assemblies, repairs or adjustments at the installation site.

All these advantages therefore contribute to reducing the production and installation costs of such wind turbines.

The invention claimed is:

1. A wind turbine blade comprising an outer casing formed at least in part of panels of thermoplastic polymer composite, defining a leading edge and a trailing edge of the wind turbine blade, and at least one stiffening member, made of polymer composite and extending along a longitudinal axis of the wind turbine blade, inside said wind turbine blade, said at least one stiffening member being arranged between at least one panel defining the leading edge and at least one panel defining the trailing edge,
  wherein the thermoplastic polymer composite comprises a fibrous reinforcement and a (meth)acrylic thermoplastic polymer matrix selected from the group consisting of poly(methyl methacrylate) (PMMA), copolymers of methyl methacrylate (MMA), or mixtures thereof,
  wherein at least one panel of thermoplastic polymer composite is connected to the at least one stiffening member by a weld-type interface,
  wherein the wind turbine blade comprises at least one resistive filament positioned at the weld-type interface,
  wherein the weld-type interface has a thickness of greater than or equal to 1 mm, wherein the wind turbine blade does not comprise more than 40% by weight of thermosetting polymer, wherein the wind turbine blade does not comprise more than 10% by weight of thermosetting adhesive, wherein the fibrous reinforcement is based on either continuous fibers or long fibers obtained from continuous fibers, both having an aspect ratio of at least 1000, wherein the (meth)acrylic thermoplastic polymer matrix has a glass transition temperature between 50° C. and 160° C., and wherein the (meth)acrylic thermoplastic polymer or a portion of the (meth)acrylic thermoplastic polymer has a melt flow index (MFI) according to ISO 1133 (230° C./3.8 kg) of less than 20 g/10 min.

2. The wind turbine blade as claimed in claim 1, wherein the fibrous reinforcement is based on continuous fibers or long fibers obtained from continuous fibers having the aspect ratio of at least 5000.

3. The wind turbine blade as claimed in claim 1, wherein the wind turbine blade does not comprise more than 30% by weight of thermosetting polymer.

4. The wind turbine blade as claimed in claim 1, wherein the wind turbine blade does not comprise more than 15% by weight of thermosetting polymer.

5. The wind turbine blade as claimed in claim 1, wherein the wind turbine blade does not comprise more than 6% by weight of thermosetting adhesive.

6. The wind turbine blade as claimed in claim 1, wherein the (meth)acrylic thermoplastic polymer matrix comprises a precursor (meth)acrylic polymer having a weight-average molecular weight greater than 50,000 g/mol.

7. The wind turbine blade as claimed in claim 1, wherein the fibrous reinforcement comprises fibers selected from the group consisting of carbon fibers, glass fibers, basalt fibers, polymer-based fibers, plant fibers, and mixtures thereof.

8. The wind turbine blade as claimed in claim 1, wherein the thermoplastic polymer matrix further comprises one or more additives or fillers.

9. The wind turbine blade as claimed in claim 1, wherein the (meth)acrylic thermoplastic polymer matrix has a glass transition temperature of between 70° C. and 140° C.

10. The wind turbine blade as claimed in claim 1, wherein the at least one stiffening member has a form of an I-beam comprising a web and two flanges connected to one another by the web.

11. The wind turbine blade as claimed in claim 10, wherein the flanges are formed by a stack of strips made of thermoplastic polymer composites that are pre-impregnated, or by composite parts that are molded by low-pressure injection or infusion.

12. The wind turbine blade as claimed in claim 10, wherein the flanges are connected to the web by a weld-type interface.

13. The wind turbine blade as claimed in claim 10, wherein the flanges are connected to the web by epoxy, polyester, or polyurethane adhesive.

14. The wind turbine blade as claimed in claim 1, wherein the weld-type interface has a thickness of greater than or equal to 2 mm.

15. The wind turbine blade as claimed in claim 1, wherein the leading edge is formed of a single monolithic part welded to the at least one stiffening member.

16. The wind turbine blade as claimed in claim 1, wherein the panels of thermoplastic polymer composite forming the outer casing enclose a low-density structure.

17. The wind turbine blade as claimed in claim 16, wherein the low-density structure is wood, a honeycomb structure or expanded plastic.

18. The wind turbine blade as claimed in claim 1, wherein the weld-type interface has a length of greater than 5 meters.

19. The wind turbine blade as claimed in claim 1, wherein the weld-type interface extends along the longitudinal axis of the wind turbine blade.

20. A wind turbine blade part made of thermoplastic polymer composite for forming the wind turbine blade as claimed in claim 1.

21. The wind turbine blade part made of polymer composite as claimed in claim 20, wherein the thermoplastic polymer composite is at least partially covered with a layer of (meth)acrylic thermoplastic polymer at least 1 mm thick.

22. A process for manufacturing the wind turbine blade as claimed in claim 1 from at least two wind turbine blade parts made of thermoplastic polymer composite, the thermoplastic polymer composite comprising the fibrous reinforcement and the (meth)acrylic thermoplastic polymer matrix, said process comprising the steps of:

arranging at the least two wind turbine blade parts made of thermoplastic polymer composite adjacently or overlapping at an assembly interface, heating to melt the (meth)acrylic thermoplastic polymer matrix at the assembly interface, and applying pressure at the assembly interface to weld the at least two wind turbine blade parts made of thermoplastic polymer composite together so as to form a weld-type interface.

23. The manufacturing process as claimed in claim 22, wherein said process further comprises a step of manufacture of the at least two wind turbine blade parts prior to the arranging step, comprising the following sub-steps:

impregnation of the fibrous reinforcement with a liquid (meth)acrylic composition, polymerization of the liquid (meth)acrylic composition, impregnating said fibrous reinforcement.

24. The manufacturing process as claimed in claim 23, wherein the liquid (meth)acrylic composition comprises a (meth)acrylic monomer, a precursor (meth)acrylic polymer and a radical initiator.

25. The manufacturing process as claimed in claim 24, wherein the (meth)acrylic monomer in the liquid (meth)acrylic composition is present at an amount of at least 40% by weight of the liquid (meth)acrylic composition.

26. The manufacturing process as claimed in claim 24, wherein the precursor (meth)acrylic polymer in the liquid (meth)acrylic composition is present at an amount of at least 10% by weight of the liquid (meth)acrylic composition.

27. The manufacturing process as claimed in claim 24, wherein the precursor (meth)acrylic polymer in the liquid (meth)acrylic composition is present at an amount of at most 60% by weight of the liquid (meth)acrylic composition.

28. The manufacturing process as claimed in claim 24, wherein in the liquid (meth)acrylic composition:

the (meth)acrylic monomer is present in a proportion of between 40% and 90% by weight of the composition, and the precursor (meth)acrylic polymer is present in a proportion of between 10% and 60% by weight of the composition.

29. The manufacturing process as claimed in claim 22, wherein the at least two wind turbine blade parts made of thermoplastic polymer composite are manufactured by low-pressure injection molding, infusion molding or by molding strips pre-impregnated with (meth)acrylic thermoplastic polymer composite.

30. The manufacturing process as claimed in claim 22, wherein the at least two wind turbine blade parts made of thermoplastic polymer composite are manufactured at a temperature of less than 150° C.

31. The manufacturing process as claimed in claim 22, wherein the (meth)acrylic thermoplastic polymer matrix is melted by a technique selected from the group consisting of: ultrasonic welding, induction welding, resistance wire welding, friction stir welding, laser welding, heating by infrared or ultraviolet radiation, and heating by resistance wire welding.

32. The manufacturing process as claimed in claim 22, wherein, during the heating step, the temperature at the assembly interface is between 160° C. and 300° C.

* * * * *